United States Patent [19]

Knetsch et al.

[11] Patent Number: 4,474,068

[45] Date of Patent: Oct. 2, 1984

[54] FLOW RATE METER

[75] Inventors: Manfred Knetsch; Peter Romann, both of Stuttgart, Fed. Rep. of Germany

[73] Assignee: Robert Bosch GmbH, Stuttgart, Fed. Rep. of Germany

[21] Appl. No.: 500,048

[22] Filed: Jun. 1, 1983

Related U.S. Application Data

[62] Division of Ser. No. 306,811, Sep. 9, 1981, Pat. No. 4,392,386.

[30] Foreign Application Priority Data

Nov. 11, 1980 [DE] Fed. Rep. of Germany ....... 3042448

[51] Int. Cl.³ ............................................. G01F 1/24
[52] U.S. Cl. ............................ 73/861.53; 73/861.76; 73/118.2
[58] Field of Search ........... 73/861.53, 861.75, 861.76, 73/118 A

[56] References Cited

U.S. PATENT DOCUMENTS 3,910,114 10/1975 Rosaen .......................... 73/861.76
3,979,956 9/1976 Bennett ........................... 73/861.76
4,073,189 2/1978 Draper ............................ 73/861.76
4,346,589 8/1982 Kienzle et al. .................. 73/861.76

Primary Examiner—Gerald Goldberg
Assistant Examiner—John E. Chapman, Jr.
Attorney, Agent, or Firm—Edwin E. Greigg

[57] ABSTRACT

A flow rate meter is proposed, which serves to ascertain the quantity of a flowing medium, in particular the air quantity aspirated by an internal combustion engine via an air intake tube. The flow rate meter includes a measuring body (3) which is pivotable in a flow conduit (2) about a shaft (5) supported in the housing (1) counter to a restoring force in accordance with the quantity of medium flowing through the conduit. The lateral gap (15, 16) between the measuring body (3) and the lateral wall of the flow conduit (2) is narrower in the range of a slight deflection of the measuring body (3) than in the range of a greater deflection. As a result, air flowing via the lateral gap (15, 16) is prevented from impairing the measuring range of the flow rate meter, so that even very slight quantities of flowing air, such as those at low engine idling, can still be measured by this flow rate meter.

1 Claim, 2 Drawing Figures

FLOW RATE METER

This is a division of application Ser. No. 306,811 filed Sept. 9, 1981, now U.S. Pat. No. 4,392,386.

BACKGROUND OF THE INVENTION

The invention is directed to an improvement in a flow rate meter having a housing and a pivotally deflectable measuring body disposed in a flow conduit. A flow rate meter is already known in which as a consequence of the leakage gap between the measuring body and the housing wall, a deflection of the measuring body and thus a measurement of the flow rate occur only above a predetermined flowing quantity of medium in the flow conduit. When the known flow rate meter is used for measuring the quantity of air aspirated by an internal combustion engine via an air intake tube, the problem thus exists that, given the low idling rpm currently required and the extremely low air quantities at idling associated therewith, a measurement of these low air quantities at idling cannot be effected with the known flow rate meter accurately, if at all.

OBJECT AND SUMMARY OF THE INVENTION

The flow rate meter according to the invention has the advantage over the prior art that the operating range of the flow rate meter is extended to encompass the lowest possible flowing quantities of a medium, because the impairment caused by leakage of the medium through the leakage gap along the housing wall and undesirable influence on the characteristic curve of the flow rate meter are prevented; this is accomplished in that the leakage gap between the measuring body and the lateral wall of the flow conduit is embodied such that it is narrower in the range of slight deflections on the part of the measuring body and is wider in the range of larger deflections on the part of the measuring body.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
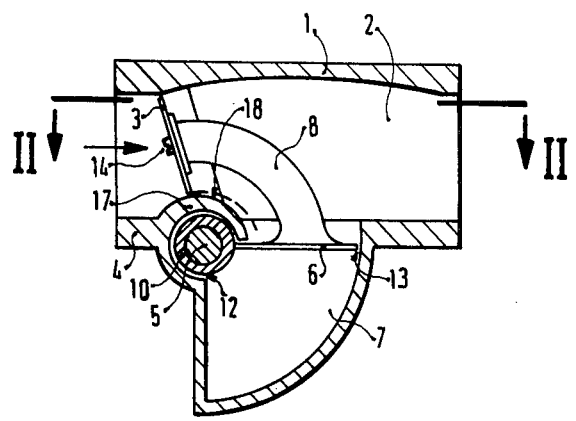
FIG. 1 shows a flow rate meter embodied in accordance with the invention.
Figure 2:
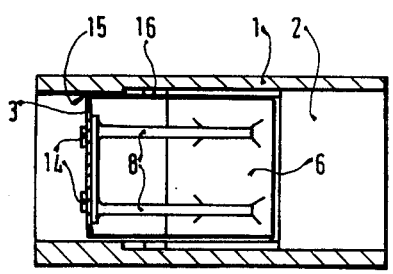
FIG. 2 is a section taken along the line II—II of FIG. 1.

In the flow rate meter shown by way of example in FIGS. 1 and 2, the air quantity, for example, aspirated by an internal combustion via an air intake tube flows in the direction of the arrow through a flow conduit 2 embodied in a housing 1 and having a measuring flap serving as the measuring body 3 to the individual cylinders (not shown) of the engine. The measuring body 3 is supported at one end in the vicinity of one wall 4 of the flow conduit 2 such that it is pivotable about a bearing shaft 5. The bearing shaft 5 is supported via ball bearings (not shown) on the housing 1, so that the pivoting movement of the measuring body 3 is effected in a virtually friction-free manner. For the specialized usage of the flow rate meter in the air intake tube of an internal combustion engine, it is efficacious to connect the flap-like measuring body 3 with a likewise flap-like damping body 6 in order to damp pulsations. Thus coupled and likewise disposed to pivot about the bearing shaft 5, the damping body 6 defines a damping chamber 7 with respect to the flow conduit 2; the damping chamber is embodied in the form of a movable wall on the housing 1 outside the flow conduit 2. The connection between the measuring body 3 and the damping body 6 may be effected via webs 8. The deflection of the measuring body 3 caused by the air quantity arriving from the direction of the arrow is effected counter to a restoring force, for instance counter to a spiral spring engaging the bearing shaft 5 but not shown. The angular position of the measuring body 3 or of the bearing shaft 5 may be picked up, for example electrically via a potentiometer, as a standard for the quantity of air flowing through it. The measuring body is illustrated in the drawing in a position which it assumes during engine idling, that is, at the lowest possible air flow rate.

A hub 10 is connected in a rotationally fixed manner with the bearing shaft 5, and the damping body 6 by way of example is connected to the hub 10, while the measuring body 3 is rigidly coupled via webs 8 to the damping body 6 and is guided in its pivoting movement within the flow conduit 2. The flap-like measuring body 3 is advantageously connected with the webs 8 by means of releasable connecting elements advantageously embodied by means of screws 14, so that the measuring body 3 can be adjusted within the flow conduit 2 in order to attain the narrowest and most parallel possible circumferential gaps. If the housing 1 is embodied as a cast part, closer manufacturing tolerances can thereby be specified. For instance, the manufacturing tolerances may be selected such that the lateral gap 15 between the measuring body 3 and the lateral wall of the flow conduit 2 in the range of a slight deflection of the measuring body 3 up to about 20° amounts to 0.15 mm, while the lateral gap 16 for a deflection greater than this may be approximately 0.4 mm. In the same manner, the housing wall 17 which surrounds and engages the hub 10 and is oriented toward the measuring body 3 is embodied such that the leakage gap 12 formed between the hub 10 and the housing wall 17 leads away from the damping chamber 7 to downstream of the measuring body 3 in the flow conduit 2, so that the intake tube pressure in the flow conduit 2 upstream of the measuring body 3 prevails at both ends of the leakage gap 12; this pressure likewise builds up in the damping chamber 7 via the circumferential gap 13 at the damping body 6, so that no flow of air occurs via the leakage gap 12 and there is no danger of soiling there.

The housing wall 17 surrounding and engaging the hub 10 and oriented toward the measuring body 3 may extend such that the gap 18 (as indicated by dashed line) formed between the measuring body 3 and the housing wall 17 becomes continuously larger as the deflection of the measuring body 3 increases.

The foregoing relates to a preferred exemplary embodiment of the invention, it being understood that other embodiments and variants thereof are possible within the scope and spirit of the invention, the latter being defined by the appended claims.

What is claimed and desired to be secured by letters patent of the United States is:

1. A flow rate meter having a housing and a measuring body disposed in a flow conduit, the measuring body being pivotally deflectable, counter to a restoring force, about a bearing shaft supported in the housing in accordance with the quantity of a medium flowing through the conduit, in particular for measuring the quantity of air aspirated by an internal combustion engine via an air intake tube, characterized in that said measuring body has two parallel side faces which extend at substantially right angles to said bearing shaft and each of which is oriented toward a lateral wall of said flow conduit, each such lateral wall of the flow conduit having a step such that a lateral gap between the measuring body and each said lateral wall is provided which is narrow in the range of a slight deflection of the measuring body and is wider in the range of a greater deflection of the measuring body.

* * * * *